(12) United States Patent
Bolt

(10) Patent No.: US 7,146,492 B2
(45) Date of Patent: Dec. 5, 2006

(54) METHOD AND APPARATUS FOR ATTACHING MORE THAN TWO DISK DEVICES TO AN IDE BUS

(75) Inventor: Thomas Bolt, Encinitas, CA (US)

(73) Assignee: Quantum Corporation, San Jose, CA (US)

( * ) Notice: Subject to any disclaimer, the term of this patent is extended or adjusted under 35 U.S.C. 154(b) by 597 days.

(21) Appl. No.: 10/071,860

(22) Filed: Feb. 8, 2002

(65) Prior Publication Data

US 2003/0154330 A1    Aug. 14, 2003

(51) Int. Cl.
*G06F 15/177* (2006.01)
(52) U.S. Cl. .......................................... 713/1; 713/100
(58) Field of Classification Search .................... 713/1, 713/100, 323, 330; 710/62
See application file for complete search history.

(56) References Cited

U.S. PATENT DOCUMENTS

| 5,644,705 | A | * | 7/1997 | Stanley | 714/42 |
| 6,067,618 | A | * | 5/2000 | Weber | 713/1 |
| 6,145,019 | A | * | 11/2000 | Firooz et al. | 710/8 |
| 6,460,099 | B1 | * | 10/2002 | Stryker et al. | 710/74 |
| 6,697,867 | B1 | * | 2/2004 | Chong, Jr. | 709/229 |
| 6,725,385 | B1 | * | 4/2004 | Chu et al. | 713/320 |
| 6,772,108 | B1 | * | 8/2004 | Stolowitz | 703/27 |
| 6,772,212 | B1 | * | 8/2004 | Lau et al. | 709/228 |
| 6,813,688 | B1 | * | 11/2004 | Wu et al. | 711/114 |
| 2003/0032333 | A1 | * | 2/2003 | Kwong | 439/638 |
| 2003/0154340 | A1 | * | 8/2003 | Bolt et al. | 710/305 |

* cited by examiner

*Primary Examiner*—Dennis M. Butler
(74) *Attorney, Agent, or Firm*—Michael Zarrabian

(57) ABSTRACT

A method of connecting and operating three or more devices to an IDE bus under the conditions that: (1) no more than two IDE devices may be active at any given time on the same IDE bus, and (2) cable/trace lengths for the IDE bus may not exceed the limits set forth in the IDE bus standard. The IDE devices are configured for cable select connected to the IDE bus, wherein no more than two of the IDE devices are powered on at any given. Further, those IDE devices which are powered on at a give time, have the appropriate logic level asserted on CSEL line so that only one IDE device powered on at any time is a "Master" device, and only one IDE device powered on is a "Slave".

34 Claims, 7 Drawing Sheets

METHOD AND APPARATUS FOR ATTACHING MORE THAN TWO DISK DEVICES TO AN IDE BUS

FIELD OF THE INVENTION

The present invention relates to inter device communication and more particular to communication between devices connected by a bus.

BACKGROUND OF THE INVENTION

The Integrated Drive Electronics (IDE) bus is commonly implemented as a secondary bus to interface mass storage devices such as hard disk drives, floppy disk drives, and CD ROM drives. The IDE bus remains the most widely-adopted bus architecture for mass storage devices in personal computer systems. An IDE controller can support a maximum of up to two IDE devices. If two IDE devices connect to one IDE controller, one device is designated as the "master" and the other as the "slave," according to the IDE protocol. Also, if two IDE controllers are incorporated simultaneously into the same computer, one bus controller is designated as the "primary" with the other as the "secondary." The master/slave and primary/secondary designations facilitate the complex negotiations between multiple IDE devices and buses.

The IDE interface has evolved from earlier hard disk interfaces in which a hard disk adapter card, including a controller, was installed in a "slot" of a computer system. Such hard disk adapter cards are typically capable of supporting up to two hard disk drives, although only one drive may be written to or read from at a time. The two drives interface to the card through an interface known as the ST506 interface. More recently developed hard disk drives comprise an embedded controller and processor removing the requirement for the adapter card to include its own controller.

For example, some existing data storage systems that utilize IDE, provide a large array of disk drives, two disk drives per IDE bus with an IDE controller. That disk drive configuration provides cost savings compared to SCSI or Fibre Channel disk drives. For packaging density, the disk drives are grouped. However, because only two disk drives may be attached to an IDE bus, this necessitates multiple IDE buses and hub controllers for each group of disk drives. The storage device utilizes separate IDE to USB controllers for each IDE disk drive, requiring three IDE to USB controllers, a hub controller, and the supporting logic and electronic devices.

There is, therefore, a need for a method and apparatus to attach more than two devices to a single IDE controller via a bus, to realize substantial cost savings and component count reductions

BRIEF SUMMARY OF THE INVENTION

The present invention provides a method of connecting and operating three or more devices to an IDE bus under the conditions that: (1) no more than two IDE devices may be active at any given time on the same IDE bus, and (2) cable/trace lengths for the IDE bus may not exceed the limits set forth in the IDE bus standard.

In one embodiment, the present invention relies upon the IDE devices being configured for cable select of the master/slave address. Three or more IDE devices are connected to the IDE bus, wherein no more than two of the IDE devices are powered on at any given. Further, those IDE devices which are powered on at a give time, have the appropriate logic level asserted on CSEL line 28 so that only one IDE device powered on at any time is a "Master" device, and only one IDE device powered on is a "Slave".

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1A:
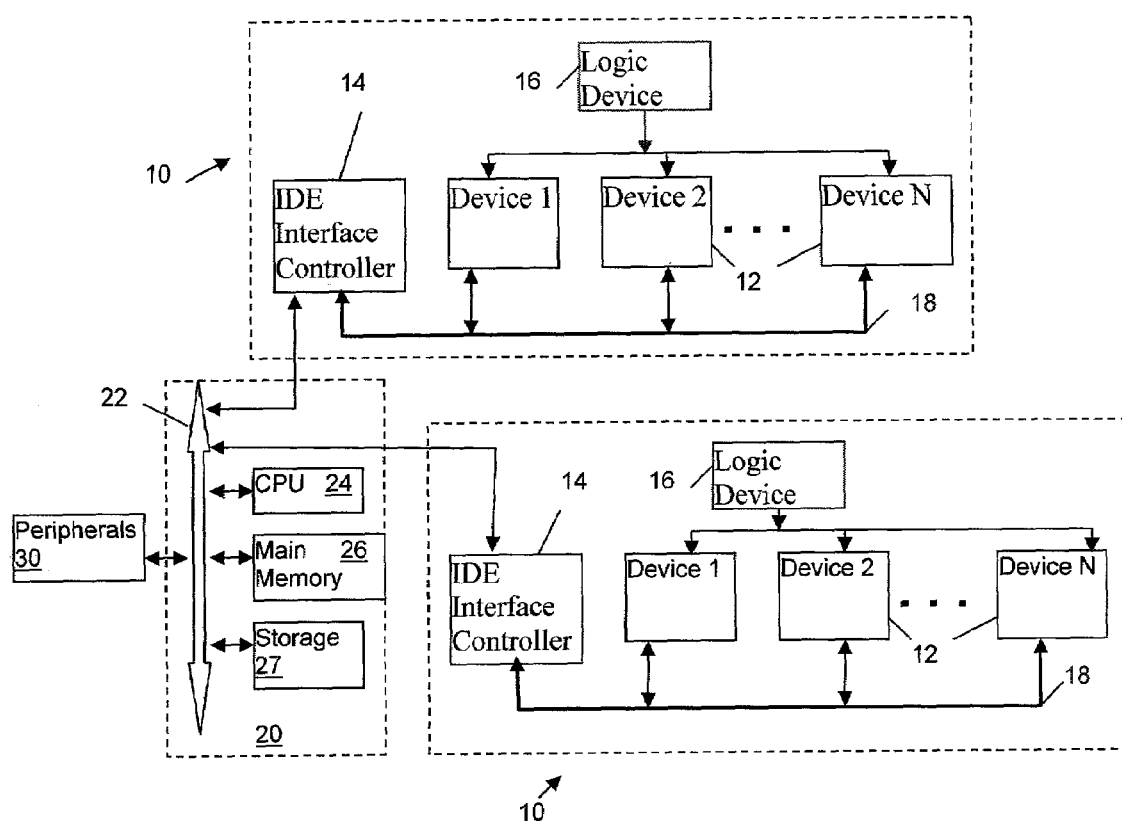
FIG. 1A shows an example block diagram of an embodiment of the architecture of the present invention.

FIG. 1A shows an example block diagram of an embodiment of an interface system 10 according to the present invention, comprising: three or more devices 12 (e.g., IDE Device1 through DeviceN), an interface controller 14, a device controller (logic device) 16, and associated cabling/interconnect circuitry.

Each IDE device 12 can comprise any of several devices such as disk drive (HDD), CD ROM, CR RW, DVD, Tape device, etc. Therefore, the present invention is not limited to a disk drive utilized as an IDE device 12 in the description herein. Further, different IDE devices 14 can be used in the each interface system 10.

The IDE interface controller 14 acts as the intermediary between the IDE device's internal controller and the rest of the system (i.e., communication with a host 20). The IDE interface controller 14 manages the flow of information over an IDE bus 18, allowing the IDE devices 14 to communicate with the host 20. In this example, the host 20 includes bus 22, CPU 24, memory 26, data storage 27, and can be connected to peripherals 30 (e.g., displays, mice, keyboards, networks, etc,).

The logic device 16 allows control of "cable select" line of the IDE bus 18 to each IDE device 12, as well as power control to each IDE device 12, as described further below. In another embodiment, described further below, one logic device 16 is used for multiple interface system 10.

The Table 1 below provides an example 40-line IDE bus 18 specification for IDE devices 12:

TABLE 1

| Line # | Signal | Line # | Signal |
|---|---|---|---|
| 1 | -RESET | 2 | GROUND |
| 3 | DD7 | 4 | DD8 |
| 5 | DD6 | 6 | DD9 |
| 7 | DD5 | 8 | DD10 |

TABLE 1-continued

| Line # | Signal | Line # | Signal |
|---|---|---|---|
| 9 | DD4 | 10 | DD11 |
| 11 | DD3 | 12 | DD12 |
| 13 | DD2 | 14 | DD13 |
| 15 | DD1 | 16 | DD14 |
| 17 | DD0 | 18 | DD15 |
| 19 | GROUND | 20 | (key) |
| 21 | DMARQ | 22 | GROUND |
| 23 | -DIOW:STOP | 24 | GROUND |
| 25 | DIOR:-HDMARDY:HSTROBE | 26 | GROUND |
| 27 | IORDY:-DDMARDY:DSTROBE | 28 | CSEL |
| 29 | -DMACK | 30 | GROUND |
| 31 | INTRQ | 32 | (reserved) |
| 33 | DA1 | 34 | -PDIAG:-CBLID |
| 35 | DA0 | 36 | DA2 |
| 37 | -CS0 | 38 | -CS1 |
| 39 | -DASP | 40 | GROUND |

Lines 3 through 18: These are the 16 data lines used for transferring data over the interface;

Line 20: This is a "key" location, used for orientation;

Line 28: This is the cable select signal used for cable select operation;

Line 34: This line is used (in part) to detect the presence of an 80-conductor IDE/ATA cable for Ultra DMA operation.

The IDE standard defines a maximum of two devices per IDE bus. One is termed the "Master" device and the other the "Slave" device. The "Master" device generally has preferential treatment on the IDE bus to achieve better performance than the "Slave" device.

There are two defined methods in the IDE specification for determining whether a device is a "Master" or "Slave" device. The first is explicit selection via switches or jumpers on the IDE device itself. The second method is termed "cable select" (CSEL), wherein the presence of a logic state on CSEL line 28 of the IDE bus determines whether the device is the "Master" or "Slave" device. For example, for each IDE device, if the CSEL circuit is closed, that IDE device is Master (primary); if the CSEL circuit is open, then that IDE device is Slave (secondary).

In one embodiment, the present invention relies upon the IDE devices 12 being configured for the second option above (i.e., "cable select"). Three or more IDE devices 12 are connected to the same IDE bus 18, wherein no more than two of the IDE devices 12 are powered on (activated) at a time. Further, those IDE devices 12 which are powered on at a give time, have the appropriate logic level asserted on CSEL line 28 so that only one IDE device powered on at any time is a "Master" device, and only one IDE device powered on is a "Slave".

Figure 1B:
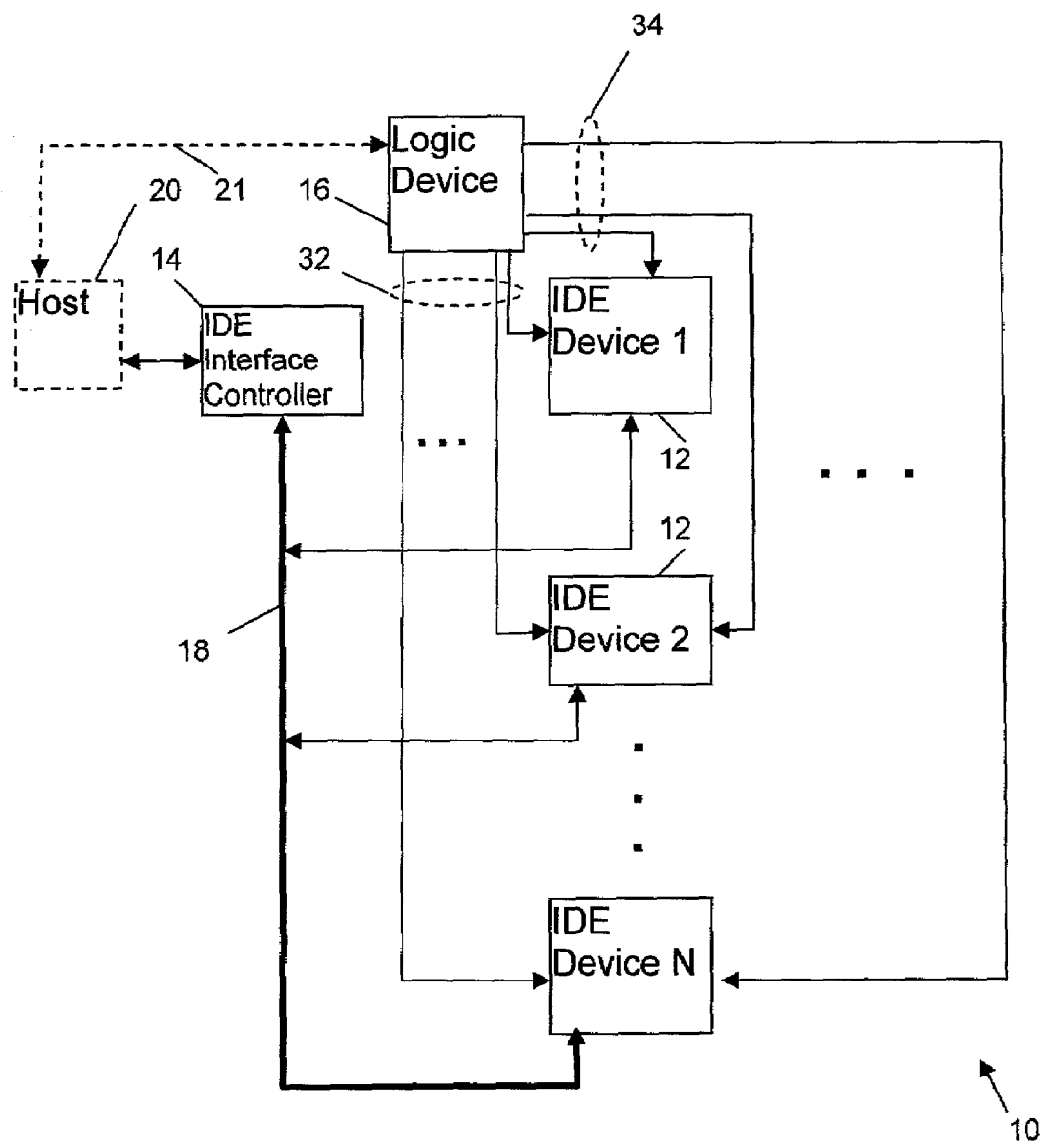
FIG. 1B shows a more detailed diagram of the architecture of FIG. 1A.

Referring to the example version shown in FIG. 1B, the logic device (logic/controller device) 16 allows control of CSEL line 28 (CSEL select lines) of each IDE device 12. In this version, the CSEL lines for devices 1 through N are connected to separate outputs of the logic device 16 via connections 32, so that the logic device 16 can control the logic state of the CSEL line to each IDE device 12 individually. The logic device 16 also controls power on or off for each IDE device 12 using power control connections 34 to e.g. power transistors which are essentially solid state switches that control whether the associated IDE device 12 is powered on or off.

In this manner, the logic device 16 can control which IDE devices 12 are powered on at any given time, as well as the "Master/Slave" configuration of the IDE devices 12 powered on. In one version, the logic device 16 can comprise a software controller. The version of the logic device 16 described herein comprises a Field Programmable Gate Array (FPGA). The logic device 16 functions to allow the host 20 (i.e., CPU 24) to specify which IDE devices 12 should be powered on and what the IDE address should be (i.e. master or slave). The logic device 16 accomplishes that by driving the CSEL line to the appropriate logic level. Other versions of the logic device 16, such as ASICs, discrete logic components, etc. are possible which perform the functions described herein.

In this example, the CPU 24 controls selection of master/slave of IDE devices 12 under software control via signals/command to each logic device 16 (e.g., via a connection 21). In one example, when a request is made to access data, a determination is made as to which IDE device 12 contains the data. The IDE device 12 is then powered up. For master/slave selection, if no devices on the IDE bus 18 are powered on yet, the first powered on IDE device 12 is set to master for performance reasons. If a second IDE device 12 needs to be powered up due to a separate request for data, the second IDE device 12 is assigned the slave address. No more than two IDE devices 12 on the same IDE bus may be accessed simultaneously.

There is a point to point connection from separate output pins of the logic device FPGA 16 to the CSEL line of each IDE device 12 on the common IDE bus (the CSEL line of the IDE controller is not used). The logic device can then independently drive the state of CSEL line for any IDE device 12 to any value.

The CPU 24 is ultimately responsible for setting the master/slave address via the logic device 16, and the CPU 24 maintains knowledge of which IDE device 12 is at which address. When the CPU 24 elects to issue a command via the IDE controller 14, the CPU 24 specifies the IDE device address (master or slave) that the command is intended for. Both master and slave IDE devices 12 actually "see" the command, however by inspecting the contents of the command the IDE devices 12 can determine whether the command was intended for the master or slave IDE device. In one version, each IDE device is aware of its own address, whereby if the command was not intended for that IDE device, that IDE device ignores the command.

As such, the present invention allows connection of three or more IDE devices 12 (e.g., disk drives) to a single connector, so long as only two of the IDE devices 12 are active at any given time, and the maximum cable/trace lengths defined in the IDE standard are not exceeded per IDE device (e.g., about 18 inches).

Figure 2A:
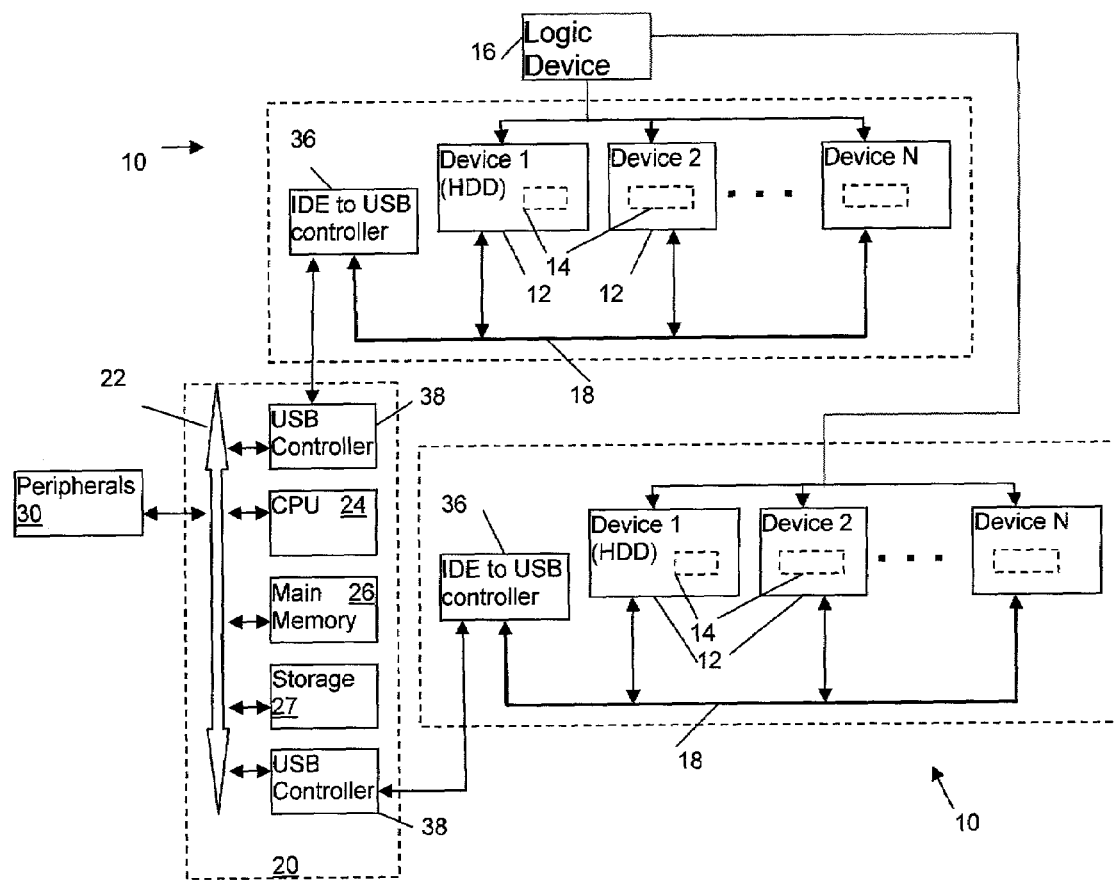
FIG. 2A shows an example block diagram of another embodiment of the architecture of the present invention.
Figure 2B:
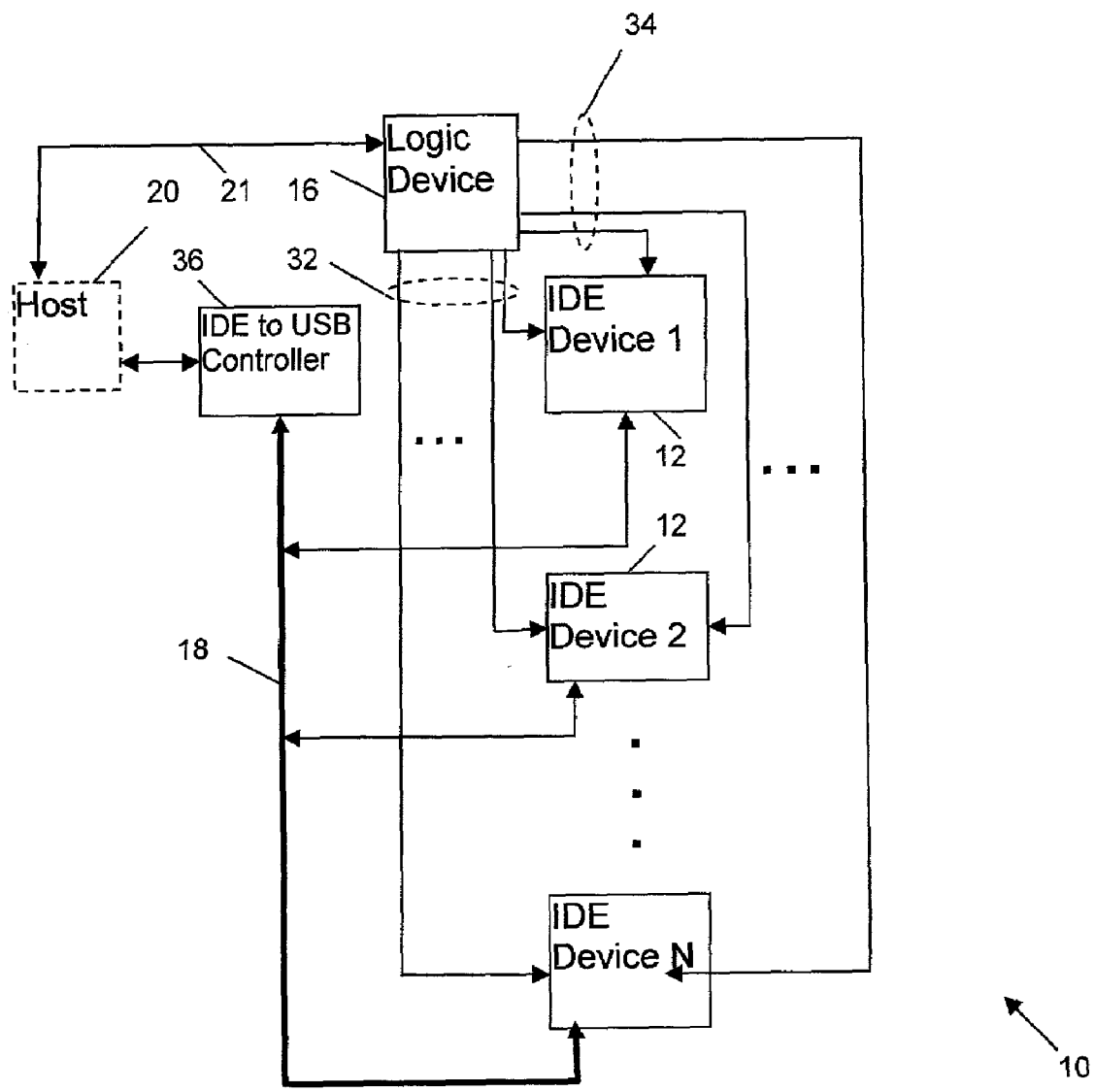
FIG. 2B shows a more detailed diagram of the architecture of FIG. 2A.

FIG. 2A shows another embodiment of the present invention, wherein the IDE bus 18 is connected to an Universal Serial Bus (USB) to IDE controller 36. Each IDE device 12 an include an IDE controller 14 within the IDE device 12, connected to the IDE to USB controller 36 (converter or USB to ATA Bridge) via the bus 18. Further, the IDE to USB protocol converters 36 are connected to root USB controllers 38 (e.g., in the host 20). FIG. 2B, shows a more detailed diagram of FIG. 2A. This version of the invention functions essentially the same as the example shown in FIGS. 2A–B and described further, below.

Figure 3:
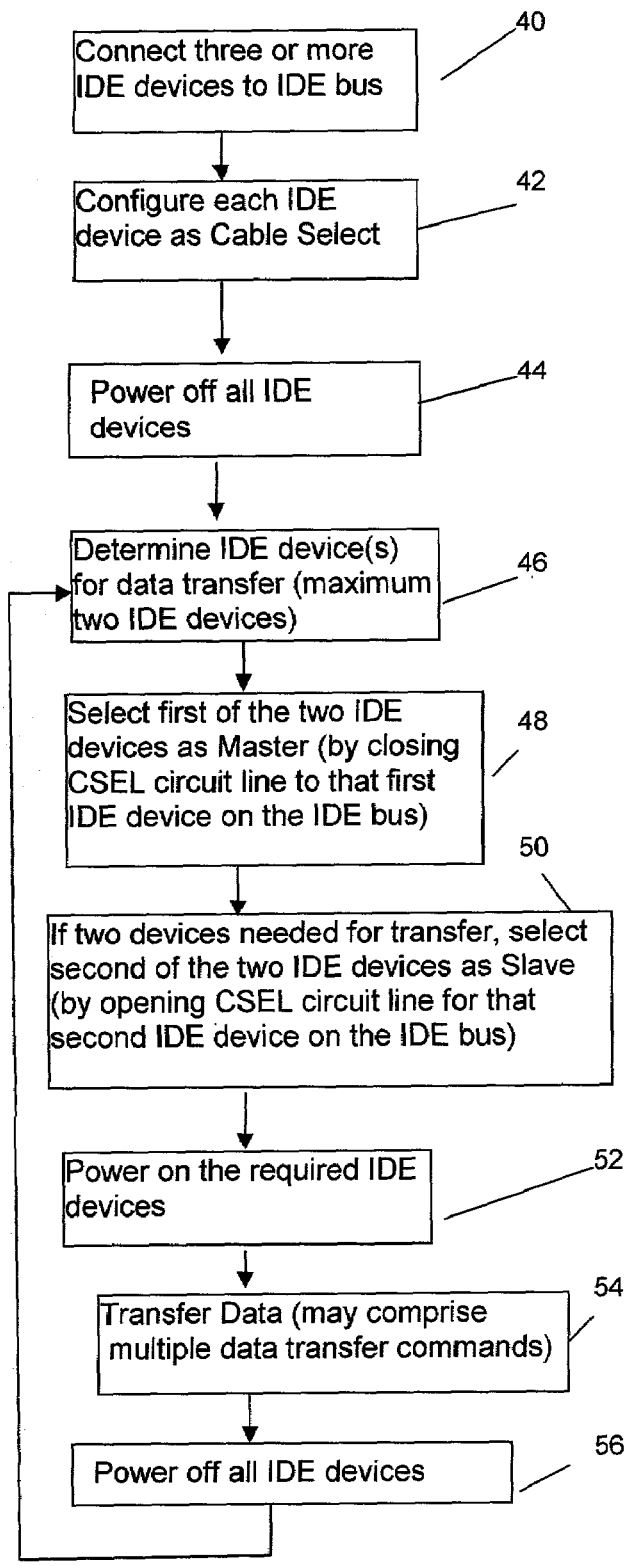
FIG. 3 shows an example flowchart of the steps of an embodiment of the method of present invention.

FIG. 3 shows an example flow diagram of an embodiment of the method of present invention, including the steps of: Connect three or more IDE devices to 12 the IDE bus 18 (step 40); Configure each IDE device 12 as Cable Select (step 42); Power off all IDE devices 12 (step 44); Determine IDE device(s) 12 for data transfer (maximum two IDE devices) (step 46); Select first of the two IDE devices 12 as Master (by closing CSEL circuit line to that first IDE device on the IDE bus) (step 48); If two IDE devices 12 needed for transfer, select second of the two IDE devices 12 as Slave (by opening CSEL circuit line for that second IDE device on the IDE bus) (step 50); Power on the required IDE devices 12 (step 52); Transfer Data (may comprise multiple data transfer commands) (step 54); and Power off all IDE devices 12 (step 56). The above steps are repeated as necessary, for data transfer between the CPU 24 and other of the IDE devices 12. In the description herein data transfer and data communication include communication of control signals/information, as necessary.

The above device selection and activation steps can be implemented in the logic device 16 for selective power up and cable select. As such, the logic device 16 selectively activates two of the IDE devices 12 at a time, then asserts the CSEL line for one of the two devices 12 to select a Master device, and deasserts CSEL line for the other of the two devices 12 to select a Slave device. Then the CPU 24 can communicate with the activated devices 12 over the IDE bus 18.

Figure 4:
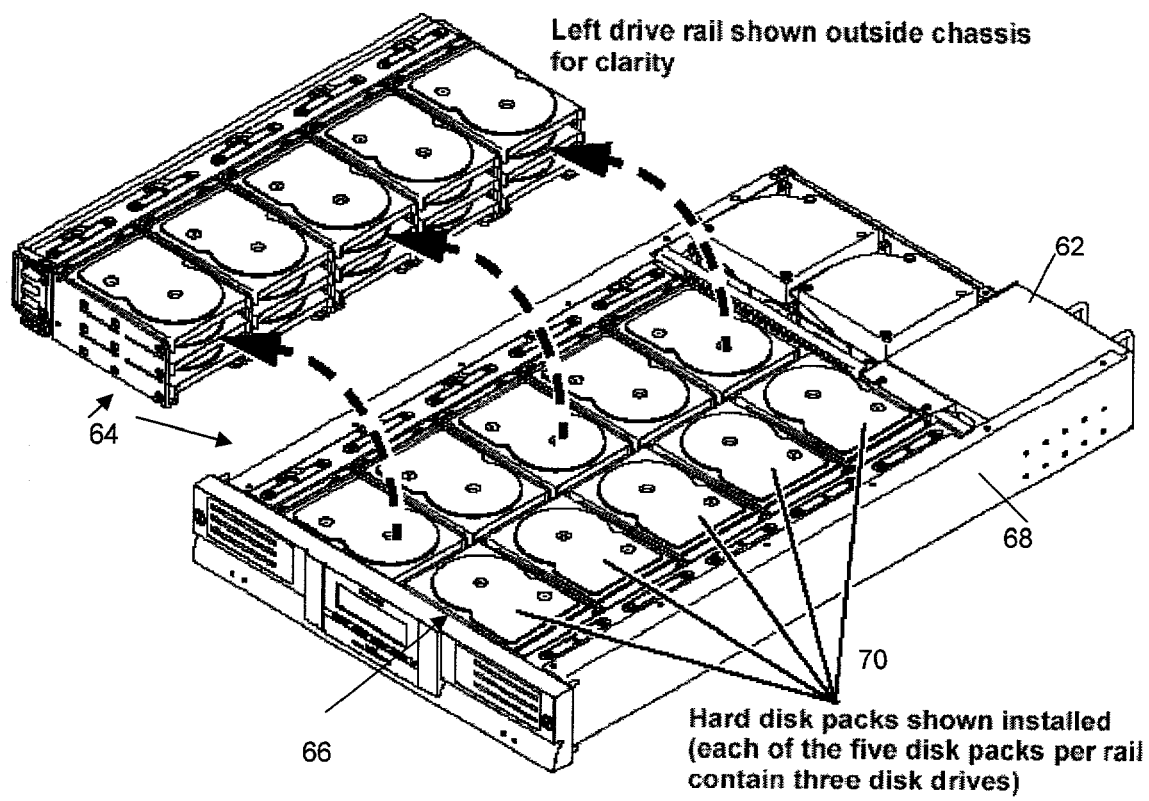
FIG. 4 shows a perspective view of a schematic diagram of an example data storage system according to another aspect of the present invention.
Figure 5:
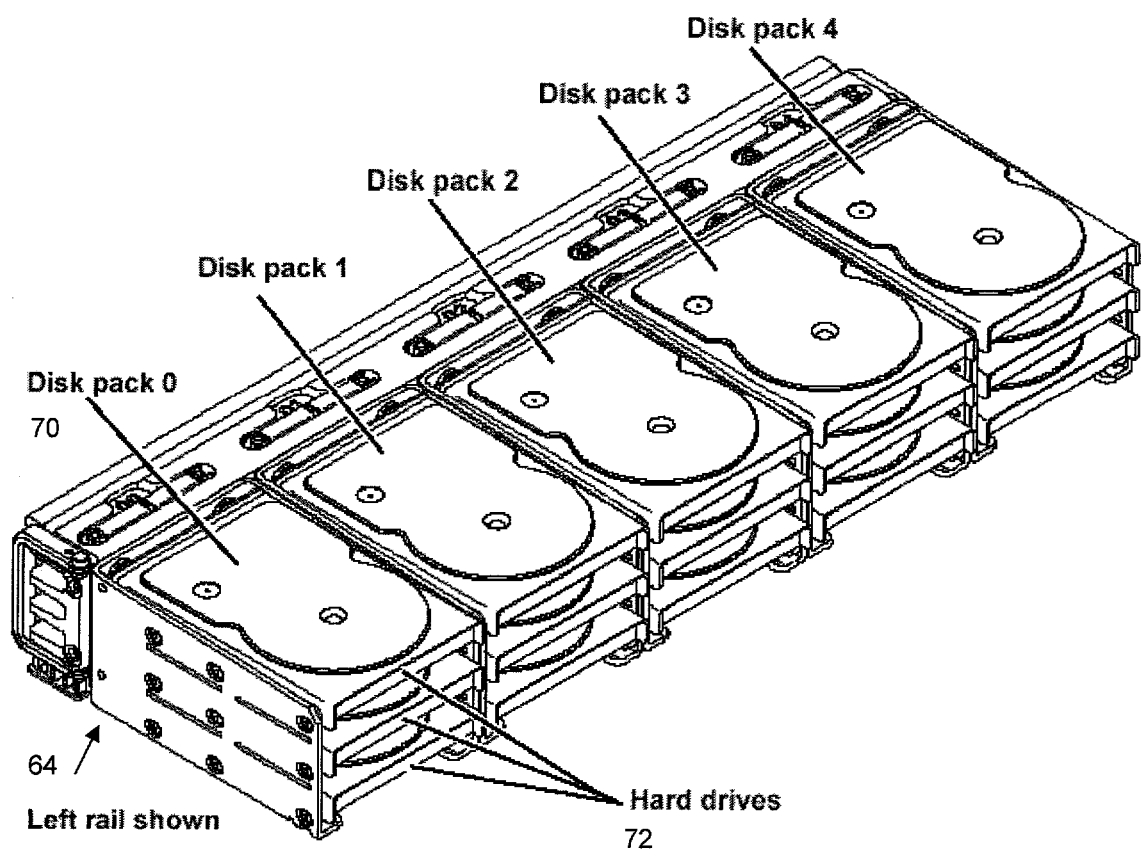
FIG. 5 shows a more detailed view of the disk drives in FIG. 4.

The present invention is applicable to different systems that utilize IDE devices (e.g., disk drives). FIG. 4 shows an example data storage system 60 comprising three main components: a controller (e.g., host or CPU) 62, left rail disk drives 64 and right rail disk drives 66, in a housing 68. As shown in FIG. 5, each rail includes e.g. five disk drive packs 70, and each disk drive pack 70 includes e.g. three disk drives 72, wherein each disk drive is an example of an IDE device. The three disk drives 72 in each drive pack 70 are connected to a single USB to ATA protocol converter (i.e., IDE to USB controller) 36 in the drive pack 70, much the same way as shown diagrammatically by example in FIGS. 2A–B.

Without the present invention, each drive pack of three disk drives requires three separate USB to ATA protocol converters (one converter per disk drive). Further, a USB hub is needed to connect the USB to ATA converters to a USB controller in the host. However, in this example, the present invention provides a method to attach three IDE disk drives to a single USB to ATA protocol converter, and eliminate the USB hub and two of the USB to ATA protocol converters from each drive pack. This provides considerable cost savings and complexity reduction per disk drive pack, and therefore the data storage system.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for communicating data between a processor and one or more devices over an IDE bus, comprising the steps of:
   connecting three or more devices to an IDE bus;
   configuring each device as Cable Select; and
   providing a device controller that selectively activates any two of the devices at the same time for data communication over the IDE bus.

2. The method of claim 1, further comprising the steps of, the device controller:
   identifying one or two of said three or more devices for data communication with the processor;
   selecting a first of the identified devices as a master device;
   if more than one device identified, then selecting the second of the identified devices as a slave device; and
   activating each selected device, such that a maximum of only two devices among said three or more devices are active at the same time, whereby the activated devices can communicate with the processor over the IDE bus.

3. The method of claim 2, further comprising the steps of, the device controller receiving identity of said devices for data communication from the processor.

4. The method of claim 1, wherein the device controller is configured to activate two of said three or more devices connected to the IDE bus at a time, and to deactivate the remaining of said three or more devices.

5. The method of claim 4, wherein the device controller is configured to activate said two devices by powering the two devices on, and to deactivate said remaining devices by powering said remaining devices off.

6. The method of claim 1, wherein the device controller is configured to select each of said two devices via a selection signal for each of said two devices.

7. The method of claim 6, wherein said selection signal comprises the IDE Cable Select line of each device.

8. The method of claim 1, wherein at least one of the devices on the IDE bus comprises a disk drive.

9. A method for communicating data between a processor and three or more devices over an IDE bus, comprising the steps of:
   (a) deactivating all the devices;
   (b) identifying any one or any two of the devices for data communication with the processor;
   (c) selecting a first of the identified devices as a master device;
   (d) if more than one device identified, selecting the second of the identified devices as a slave device;
   (e) activating each selected device, such that when any two devices are identified, then two devices are active at the same time; and
   (f) communicating data between the processor and each activated device, over the IDE bus.

10. The method of claim 9, further comprising the step of:
    (g) deactivating all of the devices.

11. The method of claim 9, further comprising the steps of repeating steps (a) through (f).

12. The method of claim 9, further comprising the steps of, before step (a), connecting three or more IDE devices to the IDE bus.

13. The method of claim 9, further comprising the steps of, before step (a), configuring each device as Cable Select.

14. The method of claim 13, wherein:
    step (c) further comprises the steps of selecting the first identified device as a master device via the Cable Select signal for that first device; and
    step (d) further comprises the steps of selecting the second identified device as a slave device via the Cable Select signal for that second device.

15. The method of claim 9, wherein:
    in step (a) deactivating each device includes the steps of powering each device off; and
    in step (e) activating each selected device includes the steps of powering each selected device on.

16. The method of claim 9, wherein at least one of the devices on the IDE bus comprises a disk drive.

17. An Integrated Device Electronics (IDE) interface system for managing data communication between a processor and three or more devices connected to an IDE bus, the IDE interface system comprising:
- a device controller for receiving device control signals to select any two of said devices for data communication with the processor;
- wherein the device controller selectively activates any two of the devices at the same time for data communication with the processor over the IDE bus.

18. The IDE interface system of claim 17, wherein the device controller is configured to: (a) identify any one or two of said three or more devices for data communication with the processor, and receive a signal from the processor to select one or two of the devices identified, (b) in response to the signal, select one of the identified devices as a master device; (c) if more than one device identified, then select the second of the identified devices as a slave device; and (d) activate each selected device, such that a maximum of only two devices among said three or more devices are active at the same time, whereby the activated devices can communicate with the processor over the IDE bus.

19. The IDE interface system of claim 17, wherein the device controller is configured to activate two of said three or more devices connected to the IDE bus at the same time, and to deactivate the remaining of said three or more devices.

20. The IDE interface system of claim 19, wherein the device controller is configured to activate said two devices by powering the two devices on, and to deactivate said remaining devices by powering said remaining devices off.

21. The IDE interface system of claim 17, wherein the device controller is configured to select each of said two devices via a selection signal for each of said two devices.

22. The IDE interface system of claim 21, wherein said selection signal comprises the IDE cable select line of each device.

23. The IDE interface system of claim 17, further comprising an interface controller connected to said devices via the IDE bus, wherein the interface controller manages information flow between the processor and said devices over the IDE bus.

24. The IDE interface system of claim 17, wherein at least one of the devices on the IDE bus comprises a disk drive.

25. A data storage system comprising:
- three or more storage devices connected to an IDE bus for data communication with a processor over the IDE bus; and
- a device controller connected to the devices, the device controller for receiving device control signals to select any two of said devices for data communication with the processor, wherein the device controller selectively activates any two of the devices at the same time for data communication with the processor over the IDE bus.

26. The data storage system of claim 25, wherein the device controller is configured to: (a) identify any one or two of said three or more devices for data communication with the processor, and receive a signal from the processor to select one or two of the devices identified for data communication, (b) in response to the signal, select one of the identified devices as a master device; (c) if more than one device identified, then select the second of the identified devices as a slave device; and (d) activate each selected device, such that any two selected devices are active at the same time, whereby the activated devices can communicate with the processor over the IDE bus.

27. The data storage system of claim 25, wherein the device controller is configured to activate any two of said three or more devices connected to the IDE bus at the same time, and to deactivate the remaining of said three or more devices.

28. The data storage system of claim 27, wherein the device controller is configured to activate said two devices by powering the two devices on, and to deactivate said remaining devices by powering said remaining devices off.

29. The data storage system of claim 25, wherein the device controller is configured to select each of said two devices via a selection signal for each of said two devices.

30. The data storage system of claim 29, wherein said selection signal comprises the IDE cable select line of each device.

31. The data storage system of claim 25, further comprising an interface controller connected to said devices via the IDE bus, wherein the interface controller manages information flow between the processor and said devices over the IDE bus.

32. The data storage system of claim 25, wherein at least one of the devices on the IDE bus comprises a disk drive.

33. The data storage system of claim 25 further comprising:
- a USB-to-IDE controller connected between the IDE bus and the processor, such that the storage devices are connected to the USB-to-IDE controller via the IDE bus;
- wherein the device controller selectively activates the devices for data communication with the processor via the USB-to-IDE controller over the IDE bus.

34. The data storage system of claim 33 further comprising:
- a USB controller connected to the processor, wherein the USB-to-IDE controller is connected between the IDE bus and the USB controller, such that the device controller selectively activates the devices for data communication with the processor via the USB controller and the USB-to-IDE controller over the IDE bus.

* * * * *